US012656474B2

(12) United States Patent
Tögel et al.

(10) Patent No.: US 12,656,474 B2
(45) Date of Patent: Jun. 16, 2026

(54) RADAR SYSTEM FOR CONTROLLING ACCESSES TO AN ENVIRONMENT

(71) Applicant: Inxpect S.p.A., Brescia BS (IT)

(72) Inventors: Achim Tögel, Brescia BS (IT); Nicolò Antonante, Brescia BS (IT); Alban Muzaka, Brescia BS (IT); Bruno Treachi, Brescia BS (IT); Ivan Paderno, Brescia BS (IT); Lorenzo Nava, Brescia BS (IT); Kai Tuncsik, Brescia BS (IT)

(73) Assignee: INXPECT S.P.A., Brescia BS (IT)

( * ) Notice: Subject to any disclaimer, the term of this patent is extended or adjusted under 35 U.S.C. 154(b) by 558 days.

(21) Appl. No.: 17/961,634

(22) Filed: Oct. 7, 2022

(65) Prior Publication Data

US 2023/0116119 A1    Apr. 13, 2023

(30) Foreign Application Priority Data

Oct. 8, 2021    (IT) ......................... 102021000025829

(51) Int. Cl.
| | |
|---|---|
| G01S 13/56 | (2006.01) |
| B25J 9/00 | (2006.01) |
| G01S 13/88 | (2006.01) |

(52) U.S. Cl.
CPC ............. G01S 13/56 (2013.01); B25J 9/0096 (2013.01); G01S 13/881 (2013.01)

(58) Field of Classification Search
CPC ............................... G01S 13/56; G01S 13/881
See application file for complete search history.

(56) References Cited

U.S. PATENT DOCUMENTS

2010/0321184 A1* 12/2010 Dreuillet ................. G01S 13/56
                                                         340/540

FOREIGN PATENT DOCUMENTS

| EP | 3112900 | | 1/2017 |
|---|---|---|---|
| EP | 3112900 A1 | * | 1/2017 |

OTHER PUBLICATIONS

IT Search Report, Written Opinion dated Jun. 1, 2022; App 102021000025829; 19 pages.

* cited by examiner

*Primary Examiner* — Robert W Hodge
*Assistant Examiner* — Helena H Seraydaryan
(74) *Attorney, Agent, or Firm* — Rankin Hill & Clark, LLP; Erik J. Overberger

(57) ABSTRACT

A radar system controls accesses to an environment where a machinery can be present. Radar devices are placed along an access path to the environment. The radar devices check the presence of targets in passage regions, arranged to be sequentially met along the access path. A control unit has stored predetermined ordered entry and exit sequences of events, given by changes of the passage regions between occupied and clear. If the registered sequence matches the entry sequence, that is the passage regions are occupied in the correct order, the environment is classified as occupied, and the machinery stops working. The machinery restarts when the environment is classified again as clear, based on the registered sequence matching the exit sequence, that is the passage regions being cleared in order.

15 Claims, 6 Drawing Sheets

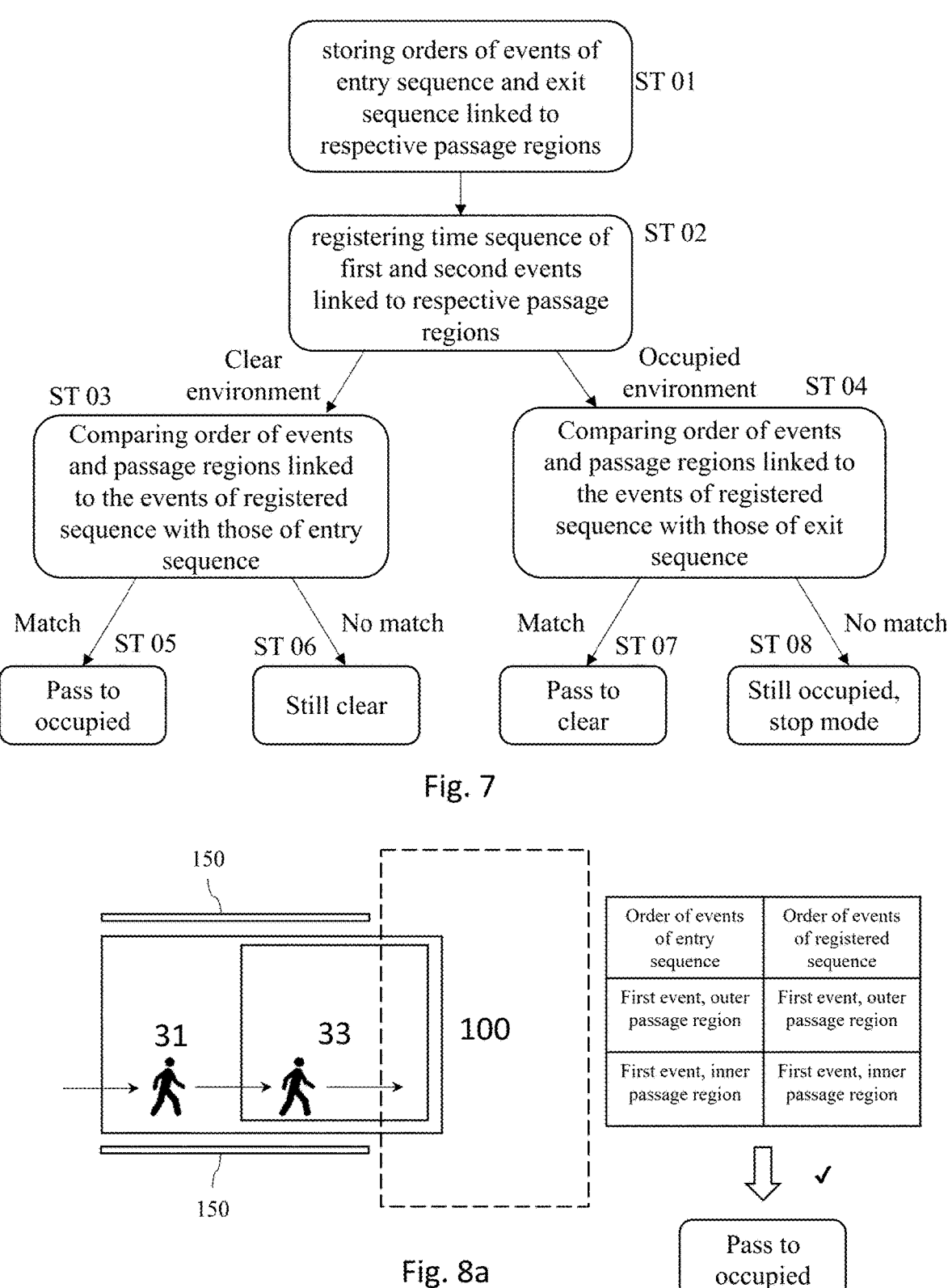

storing orders of events of entry sequence and exit sequence linked to respective passage regions | ST 01 registering time sequence of first and second events linked to respective passage regions | ST 02

ST 03 — Clear environment
Comparing order of events and passage regions linked to the events of registered sequence with those of entry sequence Occupied environment — ST 04
Comparing order of events and passage regions linked to the events of registered sequence with those of exit sequence Match | ST 05
Pass to occupied ST 06 | No match
Still clear Match | ST 07
Pass to clear ST 08 | No match
Still occupied, stop mode

Fig. 7

| Order of events of entry sequence | Order of events of registered sequence |
|---|---|
| First event, outer passage region | First event, outer passage region |
| First event, inner passage region | First event, inner passage region |

Pass to occupied

Fig. 8a

RADAR SYSTEM FOR CONTROLLING ACCESSES TO AN ENVIRONMENT

FIELD OF THE INVENTION

The present invention relates to the field of safety in industrial workplaces, to prevent harmful contacts with dangerous machinery.

BACKGROUND OF THE INVENTION

Safety in industrial workplaces often involves detection systems for assessing if a safety distance exists between potentially dangerous machinery and the working personnel. Depending on the specific kind of machinery, some national and international regulations set safety standards to be met.

One kind of machinery that could become dangerous for a person is given by palletizers. Palletizers are usually provided with robotic arms to load products on a pallet, and/or to wrap the loaded pallet for subsequent shipment. Thus, palletizers are enclosed in an environment by a protective fence along most of their perimeter. However, an operator needs to reach the palletizer with a forklift or similar vehicle to load and/or unload it. Therefore, an access path is provided through the main fence, to reach a loading area in the dangerous environment of the palletizer.

Safe access to the palletizer is regulated by DIN EN 415-4, section 5.13. This provides that, as shown in FIG. 1, access to the loading area is checked, so that the palletizer, numbered 120, can be stopped as long as the operator is close to it. The access path 140 extends toward the machinery 120 between two side fences 150. Along the path 140, two induction coils 200, 300 are arranged in sequence below the floor, one closer and one further from the palletizer 120, so that they will be met in sequence while accessing the loading area. Moreover, between the induction coils 200, 300 there is arranged a light curtain 400, also named Active Optoelectronic Protective Device (AOPD).

Each of the coils 200, 300 and the light curtain 400 will sense a forklift or an operator occupying a respective portion of the access path 140 to the loading area. In particular, a forklift accessing the loading area will trigger in sequence the outer coil 200, the light curtain 400 and the inner coil 300. All the respective detection areas will remain occupied until the forklift leaves the loading area. Then, the inner coil 300, the light curtain 400 and the outer coil 200 will be released in sequence.

A control unit receives the outcome of all these sensing operations, and checks if the above sequences are met or not. Starting from the loading area being empty, when the sensors reveal that the entry sequence is met, the control unit determines that the loading area has been occupied, and so imparts an interrupt signal to the palletizer 120. This is not triggered in case some detection signal is received, without fulfilling the whole entry sequence. For example, in case a person walks by the outer coil 200 without entering the loading area, the entry sequence will not be completed and the palletizer 120 may keep on working.

Then, starting from the loading area being occupied, when the exit sequence is met, the control unit determines that the loading area has been cleared, and so imparts a restart signal to the palletizer 120. It is worth noting that some cases occur where the exit sequence is not met, for example because of multiple persons accessing the loading area without a forklift and moving in and out of some detection areas disorderedly. In such instances, as the exit sequence is not met, the control unit can no more determine if the loading area has been cleared or not. Thus, it will launch a stop mode, where the palletizer 120 cannot be restarted just by subsequently fulfilling the exit sequence, but only after receiving a specific user input.

EP 3112900 describes a system for monitoring drilling machines for safety of personnel approaching the machine. Radars may be used to monitor an inner danger area and an outer alert area, concentric to each other, and different safety measures are taken when a target is detected in these areas. EP 3112900 describes the case of a human target approaching the drill, and thus being detected in sequence first in the alert area and then in the danger area.

However, there is no evidence that the controller unit checks if a certain sequence has been met in order, comparing registered events with previously stored sequences. Instead, a skilled person would understand from EP 3112900 that the safety measures are taken having regard only to the target being detected in a certain area, independently of the time order of areas in which it is detected.

Thus, EP 3112900 does not deal with dangerous situations where a target is no more detected in the danger area without exiting through the alert area, because for example entering a blind spot of the radar still close to the drill.

SUMMARY OF THE INVENTION

One object of the present invention is to provide an alternative, simpler but still safe arrangement for monitoring accesses to a palletizer. More in general, this object may be extended to motoring accesses to any environment, in particular where a danger is envisaged inside the environment.

This and other objects are fulfilled by a radar system for controlling accesses to an environment according to any one of the appended claims.

The invention replaces the induction coil and light curtain arrangement with one or more radar devices. At least one of the radar devices generates different occupancy and clearing signals based on specific passage regions of its field of view, where targets are determined to be present or absent. The arrangement of the passage regions may substantially replicate the sensing areas of the induction coils and light curtain of the prior art. However, different arrangements could be also envisaged, with higher or lower accuracy depending on the number of radar devices, on their spatial arrangement, on the definition of passage regions, and of course on the desired level of safety and cost.

More in general, at least some passage regions must be so arranged that they will be sequentially met by a target moving along the access path toward the environment.

Thus, similarly to the prior art, a control unit will check the trigger and release sequence acquired for the passage regions and determine that the environment is occupied or free when the registered sequence meets predetermined entry and exit sequences.

BRIEF DESCRIPTION OF THE DRAWINGS

The present invention will now be described in more detail hereinafter with reference to the accompanying drawings, in which embodiments of the invention are shown.

FIG. 7 is a flow chart of a control unit of the radar system switching a classification of the environment between clear and occupied by a target, and FIGS. 8*a* to 8*d* schematically show different cases of switching the classification of the environment.

DETAILED DESCRIPTION

Figure 1:
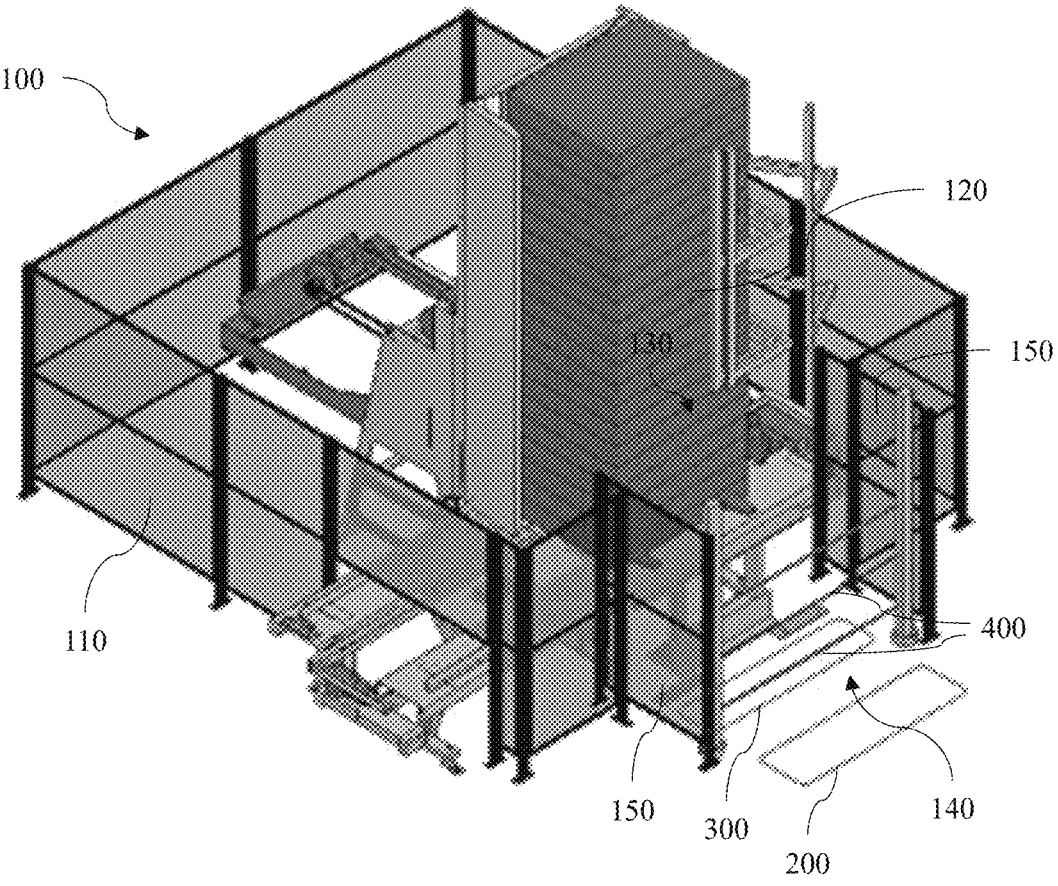
FIG. 1 is a view of an industrial environment with a system for monitoring accesses according to the prior art.

A radar system 1 is provided for controlling accesses to an environment 100. The environment 100 is surrounded by a contour barrier 110, such as a perimetral fence. In some embodiments, a danger source is located inside the environment 100, such as a machinery 120, that is preferably a palletizer.

The contour barrier 110 has an access opening 130, and an access path 140 is defined at the access opening 130 to access the environment 100 and the danger source. In some embodiments, one side of the danger source occupies the access opening 130. Thus, access to the environment 100 may be limited to access to this side of the danger source.

Two side protections 150, such as side fences, are arranged along sides of the access path 140, and are adjacent to the contour barrier 110 at the access opening 130. Thus, the access path 140 is defined between the side protections 150.

In more detail, the access path 140, as well as each side protection 150, extends along a longitudinal direction X-X. The side protections 150 are spaced apart in a transversal direction Y-Y, that is transverse, preferably perpendicular, to the longitudinal direction X-X.

The access path 140 has two longitudinal ends, namely an inner end and an outer end. The longitudinal ends are spaced apart in the longitudinal direction X-X, and the environment 100 can be found at one longitudinal end of the access path 140, namely the inner end. In particular, the inner end of the access path 140 may be a loading area of the palletizer.

It is worth noting that the invention may just consist in the radar system 1, that is provided to be applied to an existing access path 140 of an existing environment 100. Otherwise, the invention may comprise the radar system 1 and the side protections 150, so that it can be applied to an existing environment 100 while appropriately setting up a new access path 140 thereto. Still further, the whole environment 100, as well as the danger source, can be considered part of the invention too, for example where the environment 100 is natively designed including the radar system 1. One aspect of the invention may also relate to a method of controlling accesses to an environment 100 by using the radar system 1, as will be understood from the following details of the description.

The system 1 comprises one or more radar devices 2 placed along the access path 140, each having a respective field of view 3 and being configured to transmit radar signals in the field of view 3 mainly along a main transmission direction A-A. Each field of view 3 is preferably substantially symmetrical with respect to the main transmission direction A-A. At first, embodiments with only one radar device 2 will be described, but the features of the described unique radar device 2 could be applied also to the other radar devices 2, where provided.

The field of view 3 of the radar device 2 at least partially covers the access path 140. A preferred position for the radar devices 1 is at one longitudinal end of the access path 140, namely the inner end. In one embodiment, one radar device 2 is arranged at substantially equal distances from the side protections 150. This will be named as a central radar device 2. The main transmission direction A-A of the central radar device 2 extends along the longitudinal direction X-X, preferably toward the outer end of the access path 140.

An example height of the radar device 2 is 0 to 1000 mm above the floor. The radar device may be oriented with an elevation angle of 0 to 30° above the horizontal.

The radar device 2 is configured to define and store a plurality of passage regions 31, 32, 33 as parts of its field of view 3. Preferably, each passage region 31, 32, 33 is symmetrical to the main transmission direction A-A of the radar device 2.

The passage regions 31, 32, 33 are so arranged in the access path 140 as to be sequentially met by a target that follows the access path 140, moving from the outer end to the inner end, toward the environment 100. Thus, different passage regions 31, 32, 33 reach different longitudinal portions of the access path 140.

The passage regions 31, 32, 33 comprise an outer passage region 31 and an inner passage region 33. The inner passage region 33 is arranged to be met after the outer passage region 31 by the target following the access path 140 toward the environment 100. In other words, the outer passage region 31 is closer to the outer end of the access path 140 than the inner passage region 33 is.

In one embodiment, an intermediate passage region 32 is arranged to be met, by the target following the access path 140 toward the environment 100, after the outer passage region 31 but before the inner passage region 33. So, the outer passage region 31 is closer to the outer end of the access path 140 than the intermediate passage region 32 is, which in turn is closer to the outer end of the access path 140 than the inner passage region 33 is. In further embodiments, more than one intermediate passage regions 32 could be provided.

The passage regions 31, 32, 33 of a radar device 2 are distinct, but may partially overlap. In the preferred embodiments, all the passage regions 31, 32, 33 of a radar device 2 are shaped as circular sectors with respective radii and respective angular widths. Plural passage regions 31, 32, 33 can be defined with different radii and overlapping angular width. For example, all the passage regions 31, 32, 33 of a radar may have an angular width that is symmetrical to the main transmission direction A-A.

Otherwise, the passage regions 31, 32, 33 may be disjointed, and one or more of the passage regions 31, 32, 33 can be shaped as annulus sectors with different internal and external radii.

The different radii allow the passage regions 31, 32, 33 to be closer or further from the outer end of the access path 140, so that they will be sequentially met. With this condition, the radius and angular width of each passage region 31, 32, 33 are selected so as to cover the transversal width of the access path 140 the most as possible, for obvious safety reasons.

For reasons that will be specified below, it is preferable that the passage regions 31, 32, 33 do not touch the side protections 150. Accordingly, the inner passage region 33 may have a smaller radius and/or a larger angular width than the outer passage region 31 (while the intermediate passage region 32 may have intermediate values for any of these parameters).

The radar device 2 is configured to continuously detect targets in its field of view, and in particular to check the presence or absence of targets in each one of its passage region 31, 32, 33. Moreover, the radar device 2 is configured to generate occupancy signals and clearing signals for all its passage regions. The occupancy and clearing signals are different to each other, and are different and specific for distinct passage regions 31, 32, 33. In particular, an occupancy signal is generated for every passage region where a target is present, and a clearing signal is generated for every passage region where no target is present.

A control unit 4 is in signal communication with each radar device 2. A schematic example of control unit 4 is represented only in FIG. 4. In one embodiment, the control unit 4 is configured to continuously receive from each radar device 2 its occupancy and clearing signals. However, as explained below, it is more relevant for the invention the switch of a passage region 31, 32, 33 between the occupancy and clearing signals, rather than the occupancy and clearing signals themselves. Thus, the signal switches may be detected by the control unit 4 after receiving the occupancy or clearing signals, as mentioned above. Otherwise, the signal switches may be directly detected by each radar device 2, and the control unit 4 may directly receive from the radar devices 2 indications of the signal switches, without receiving the occupancy and clearing signals.

The main task of the control unit 4 is determining a classification of the environment 100, as clear environment 100 or environment 100 that is occupied by a target.

For this purpose, the control unit 4 has stored therein a predetermined ordered entry sequence of events and a predetermined ordered exit sequence of events (ST 01 in FIG. 7). The relevant events are first events, each given by a change from the clearing signal to the occupancy signal for a passage region 31, 32, 33, and second events, each given by a change from the occupancy signal to the clearing signal for a passage region 31, 32, 33. The entry and exit sequences are set up once, and then are not changed during radar operation. In other words, they are stored in a calibration phase, before beginning to cyclically check the presence of targets in the passage regions 31, 32, 33.

The control unit 4 is also configured to register a time sequence of occurring first and second events linked to respective passage regions, based on the actual occupancy and clearing signals generated for the passage regions 31, 32, 33 (ST 02 in FIG. 7).

Figures 8B, 8C, 8D:
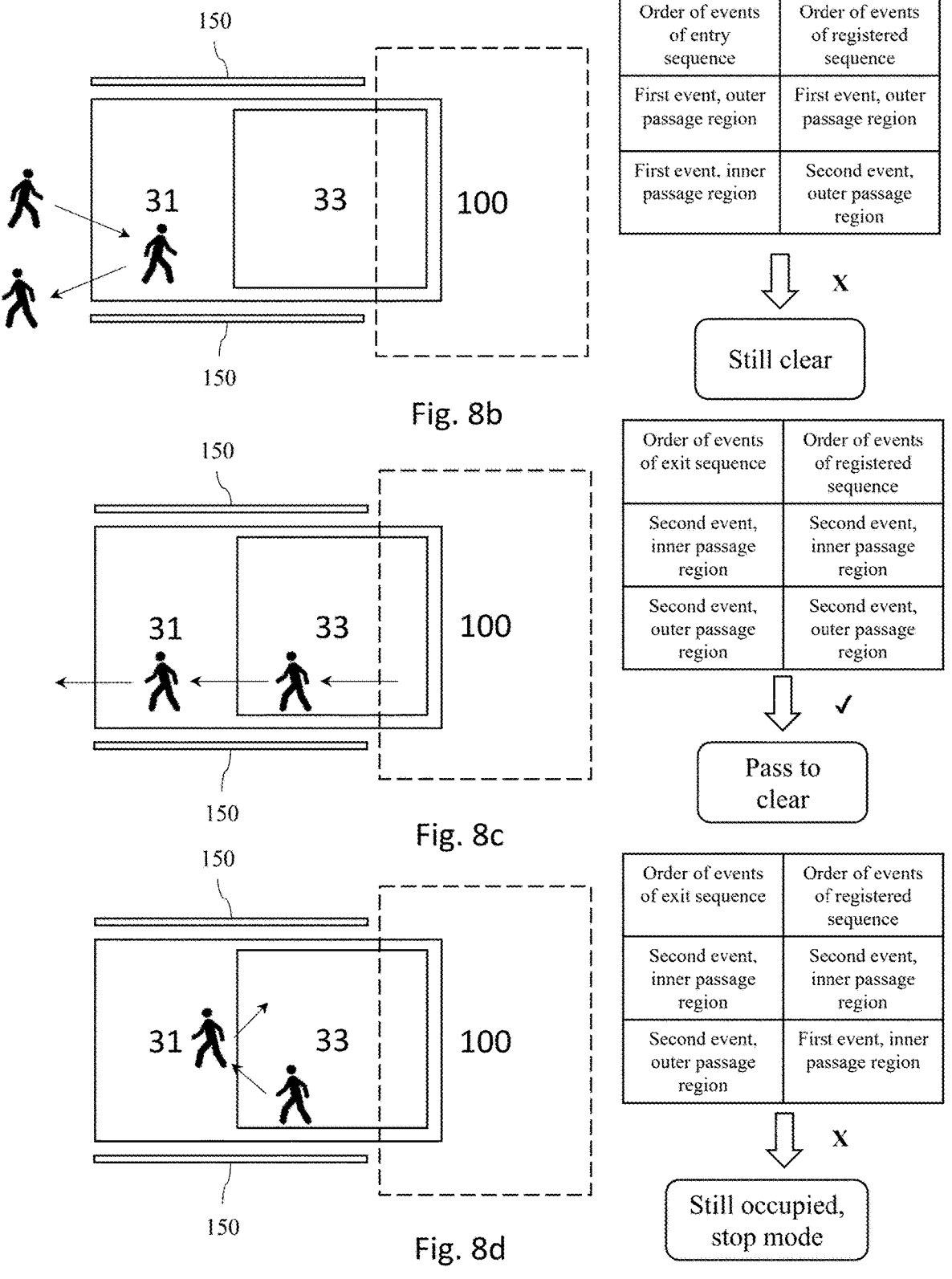

The registered time sequence is compared by the control unit to the predetermined entry and exit sequences. In more detail, when the environment 100 is classified as clear, order of events and passage regions linked to the events of the registered time sequence is compared with order of events and passage regions linked to the events of the entry sequence (ST 03 in FIG. 7), and when the environment 100 is classified as occupied, order of events and passage regions linked to the events of the registered time sequence is compared with order of events and passage regions linked to the events of the exit sequence (ST 04 in FIG. 7). Based on these comparisons, the control unit determines if the registered sequence matches or not the entry or exit sequences. In this description, a sequence is considered to be matched only if the events of the registered sequence match in order and in full the instant sequence (FIGS. 8a, 8c). For example, if the registered events correspond to the beginning of a sequence, despite being in the right order, the sequence has not yet been matched (FIGS. 8b, 8d).

In the preferred embodiment, the entry sequence includes, in the following order:
a first event for the outer passage region 31, a first event for one or more intermediate passage regions 32, if provided, and
a first event for the inner passage region 33.

When the registered time sequence matches in the correct order the entry sequence, the control unit 4 automatically changes the classification of the environment 100 from clear to occupied (ST 05 in FIG. 7, FIG. 8a). Preferably, the machinery 120 is in signal communication with the control unit 4, and the control unit 4 is configured to impart to the machinery 120 to interrupt operation when it changes the classification of the environment 100 from clear to occupied.

Instead, in case the environment 100 is classified as clear, and one or more first or second events are registered, which do not match the entry sequence, the classification of the environment 100 does not change (ST 06 in FIG. 7. FIG. 8b), and the machinery 120 may keep on working until the entry sequence is fulfilled.

The exit sequence includes, in the following order:
a second event for the inner passage region 33,
a second event for one or more intermediate passage regions 32, if provided, and
a second event for the outer passage region 31.

When the registered time sequence matches in the correct order the exit sequence, the control unit 4 automatically changes the classification of the environment 100 from occupied to clear (ST 07 in FIG. 7, FIG. 8c). Preferably, the control unit 4 is configured to impart to the machinery 120 to restart operation when it changes the classification of the environment 100 from occupied to clear.

In case the environment 100 is classified as occupied, and one or more first or second events are registered, which do not match the exit sequence, the classification of the environment 100 does not change (ST 08 in FIG. 7. FIG. 8d), and the machinery 120 does not restart working. Moreover, in this case it is preferred that the control unit 4 launches a stop mode.

When the stop mode is active, registering a time sequence matching the exit sequence is no more sufficient for the control unit 4 to automatically change the classification of the environment 100, from occupied to clear. This kind of automatic changes are prevented.

However, the control unit 4 is configured to receive a release input by a user, confirming that the environment 100 is free. When a release input is received, the stop mode is interrupted, and the control unit 4 changes the classification of the environment 100 from occupied by a target to clear.

Optionally, since an operator, especially while using a forklift, is not expected to leave the environment 100 instantaneously, the classification of the environment 100 is changed from occupied to clear only if the exit sequence starts and is fulfilled after a predetermined lapse time has passed from the completion of the entry sequence.

Figure 2:
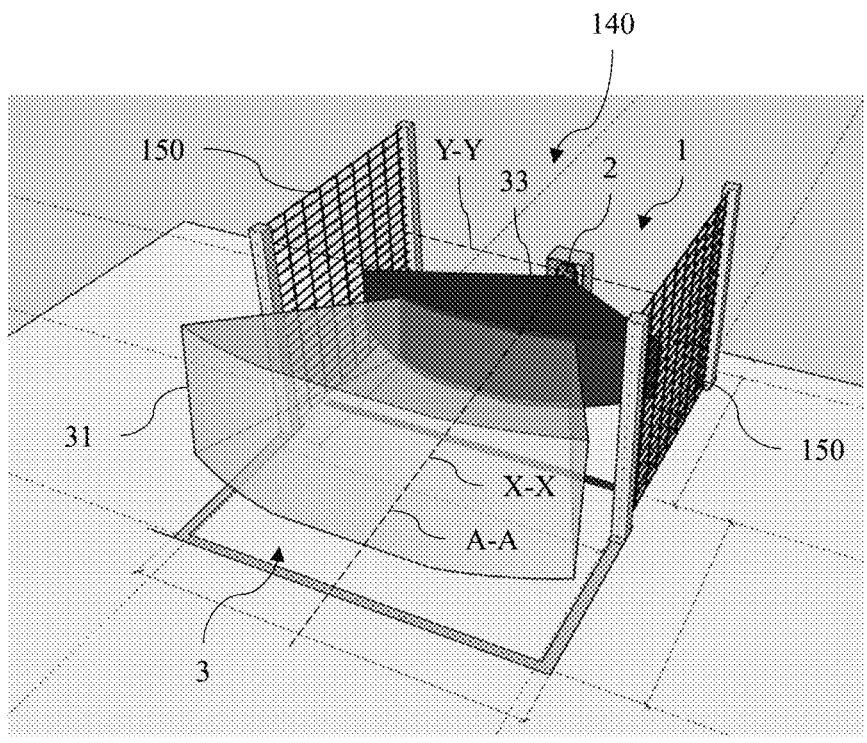
FIGS. 2 and 3 are views of alternative embodiments of radar systems for monitoring accesses to an environment according to the invention, each including one radar device, the radar devices of these embodiments having different passage regions in their fields of view.

In the embodiment of FIG. 2, one (central) radar device 2 has two passage regions 31, 33. As its passage regions 31, 33 are hard to be avoided when accessing to the environment 100, this embodiment already has a good degree of safety, though the number of sensing regions is lower than the prior art, where three areas were monitored by the outer coil, the inner coil and the light curtain.

Certain cases of movement of operators may still lead to some undesired conditions. For example, if an operator passes beyond all the passage regions 31, 33, in a blind spot of the radar device 2, in principle a second event will be registered simultaneously for the inner and outer passage regions 31, 33, thus not fulfilling the exit sequence and launching the stop mode. However, in real applications a small delay in registering the events may lead to the exit sequence to be matched, so that the machinery 120 will unsafely restart.

In presence of plural operators, when a first operator accesses the outer passage region 31 and stays, but a second operator reaches the inner passage region 33, the entry sequence will be fulfilled. Then, if the second operator reaches a blind spot of the radar device 2, a second event will be registered for the inner passage region 33 only. Thereafter, in case the first operator leaves the outer passage region 31, the exit sequence will be completed, leading to an unsafe restart.

Similar conditions to a similar extent cannot be avoided also in the prior art, and they should be prevented.

Figure 3:
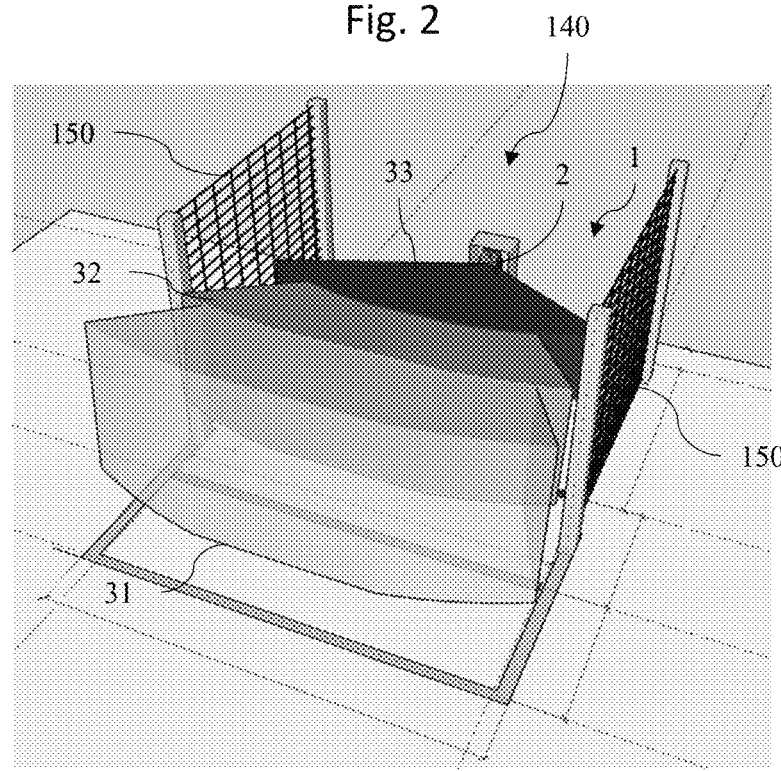

In the embodiment of FIG. 3, a single (central) radar device 2 is provided, with three passage regions 31, 32, 33. This matches the number of sensing regions of the prior art. Moreover, as the entry and exit sequences involve a greater number of ordered events to be registered, unsafety conditions are less likely to happen. In any case, any kind of arrangement of the prior art or of the invention may not reach a complete certainty that safety is guaranteed, when many operators behave in very specific conditions. So, in general multiple simultaneous accesses should be avoided.

In the following, embodiments having plurality of radar devices 2 are described. Where more than one radar device 2 is provided, it is not necessary that each radar device 2 defines a respective plurality of passage regions 31, 32, 33, but it is sufficient that one radar device 2 defines a respective plurality of passage regions 31, 32, 33, and the other radar devices 2 define one or more passage regions 31, 32, 33.

Figure 4:
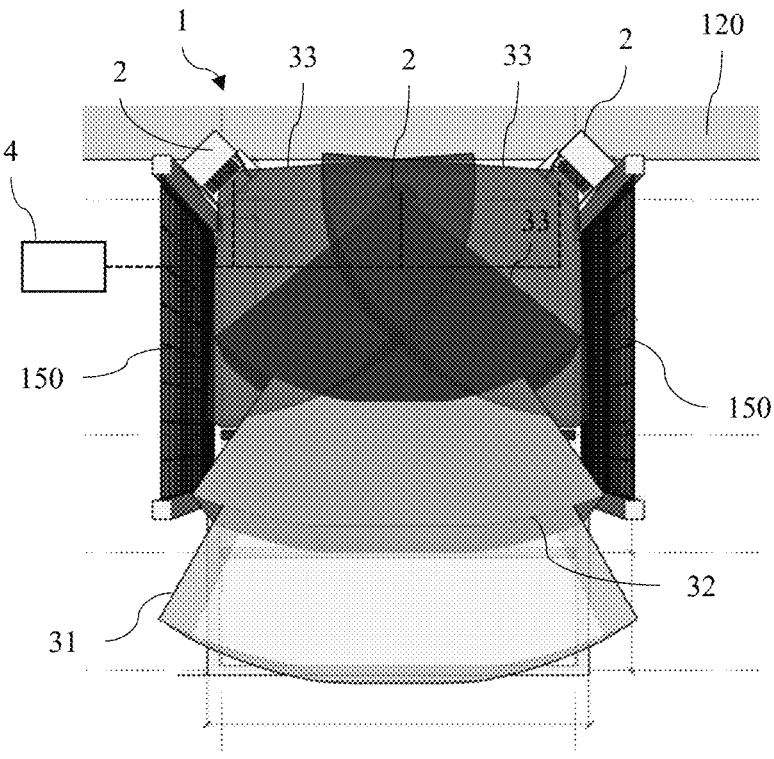
FIGS. 4 to 6 are views of alternative embodiments of radar systems for monitoring accesses to an environment according to the invention, each including plural radar device, the radar devices of these embodiments having different passage regions in their fields of view.

For example, in the embodiment of FIG. 4, the central radar device 2 defines three passage regions 31, 32, 33, while two side radar devices 2 define one passage region 33, each. Each side radar device 2 is arranged at one end of the access path 140, preferably the same end where the central radar device 2 is arranged, i.e. the inner end. Moreover, each side radar device 2 is arranged proximal to a respective side protection 150, and distal from another side protection 150.

Figure 5:
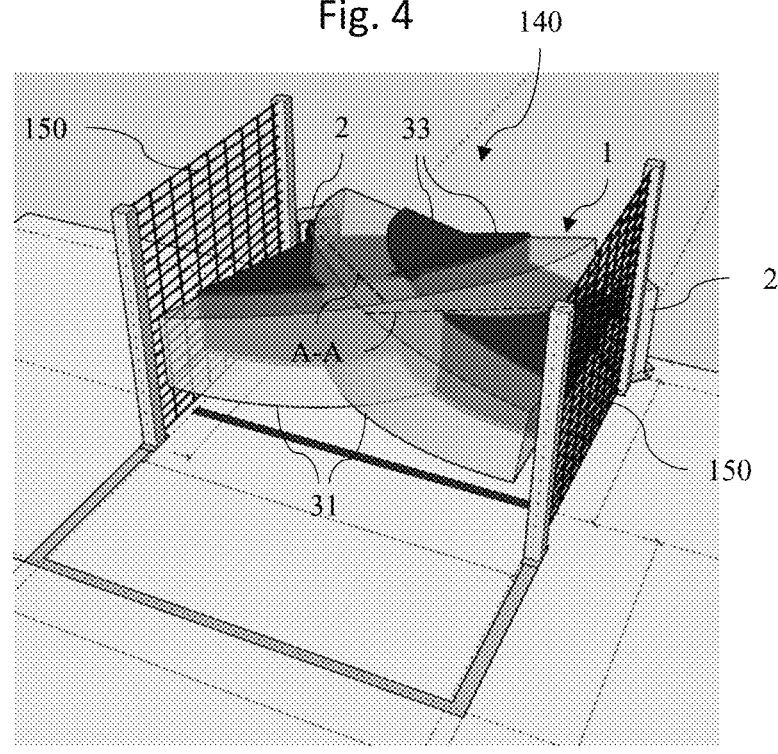

The main transmission directions A-A of the side radar devices 2 may be inclined to the longitudinal direction X-X, preferably by 30 to 60°, for example 45°. Examples of main transmission directions A-A for side radar devices 2 are shown in FIG. 5. Moreover, the angular width of the passage regions 33 of the side radar devices 2 may be equal to 90°. Thus, the fields of view 3 and some passage regions 31, 32, 33 of different radar devices 2 may overlap.

It is also preferable that the central radar device 2 is arranged at a different height above the floor than the side radar devices 2, so that no passage region 31, 32, 33 of a radar device 2 touches another radar device 2. For example, the central radar device 2 may bear on the floor, while the side radar devices 2 may be sustained above the floor, preferably at a height up to 1000 mm.

The control unit 4 will register a time sequence including first events and second events for passage regions 31, 32, 33 of all the distinct radar units 2. In some embodiments, the predetermined entry sequence and exit sequence include first and second events that are considered on an individual passage region 31, 32, 33 basis. In this case, all the passage regions 31, 32, 33 from all the different radar units 2 are functionally independent.

However, in the preferred embodiments, some passage regions 31, 32, 33 from different radar devices 2 are not independent, but are considered as groups.

In more detail, the control unit 4 is configured to store at least one predetermined group of passage regions 31, 32, 33.

Each group comprises a plurality of passage regions 31, 32, 33, each from a different radar device. For example, in the embodiment of FIG. 4, the outer passage region 31 of the central radar device 2 is not part of a group (or can be considered as an outer group with only one passage region), the intermediate passage region 32 of the central radar device 2 is not part of a group (or can be considered as an intermediate group with only one passage region), but an inner group includes the inner passage region 33 of the central radar device 2 and also the (unique) passage regions 33 of each side radar device 2.

For the sake of comparison with the entry or exit sequences, the behavior of entire groups is considered. Thus, whenever a group consist of only one passage region 31, 32, 33, the same logic as described above apply. Instead, for groups having plural passage regions 31, 32, 33 the control unit 4 is configured to combine individual occupancy signals and individual clearing signals, for all the passage regions 31, 32, 33 of the group, into group occupancy signals and group clearing signals. Then, the control unit 4 is configured to register first events and second events based on group occupancy signals and group clearing signals, and not based on individual occupancy signals and individual clearing signals for individual passage regions 31, 32, 33 of the group.

In the preferred embodiment, a group occupancy signal is generated all the times that an individual occupancy signal is generated for any one of the passage regions 31, 32, 33 belonging to the group. Moreover, a group clearing signal is generated all the times that individual clearing signals are generated for all the passage regions 31, 32, 33 belonging to the group.

The result is that a first event is registered for the group when a change occurs from a first state to a second state. In the first state, all the passage regions 31, 32, 33 of the group must be object of a clearing signal. In the second state, anyone (usually just one) of the passage regions 31, 32, 33 of the group is object of an occupancy signal. Instead, no first event is registered if, for just one passage region 31, 32, 33 of the group, the clearing signal is changed to the occupancy signal, but this change occurs when another passage region 31, 32, 33 of the same group was already object of an occupancy signal.

Similarly, a second event is registered for the group when a change occurs from the second state to the first state. Instead, no second event is registered if, for just one passage region 31, 32, 33 of the group, the occupancy signal is changed to the clearing signal, but after this change another passage region 31, 32, 33 of the same group is still object of an occupancy signal.

It is worthwhile noting that, in any case, the switch between the occupancy and clearing signals of the group will be concomitant with the switch between the occupancy and clearing signals of at least one passage region 31, 32, 33 of the group.

In a certain sense, the passage regions 31, 32, 33 of a same group could be considered equivalent to a unique passage region, or to a sensing area as those of the prior art. However, such passage regions 31, 32, 33 will in general cover different physical areas, that may partially overlap with other passage regions 31, 32, 33 of the same and other radar devices 2.

In the above context, the embodiment of FIG. 4 is advantageous in that the side radar devices 2 eliminate the blind spots of the central radar device 2. Three sensing areas are still used similarly to the prior art, two of them being given, respectively, by the outer and intermediate passage regions 31, 32 of the central radar device 2, and the other being given by the group of the inner passage region 33 of the central radar device 2 and the passage regions 33 of the side radar devices 2. As long as this group is occupied, there will be no unsafe restart.

In the embodiment of FIG. 5, only two side radar devices 2 are provided, and no central radar device 2. Each radar device 2 provides two passage regions 31, 33, that are organized in two groups, namely an outer group of outer passage regions 31 and an inner group of inner passage regions 33. Accordingly, the sensing regions can be considered as two, that are fewer than the prior art.

Blind spots are still prevented. However, this embodiment is not recommended when the access path 140 becomes too narrow, that is when the side protections 150 are close to each other. In fact, this forces the radii of the passage regions 31, 33 to be very short, and not so much different between the inner passage regions 33 and the outer passage regions 31. Thus, an operator will take a very small time to pass through the outer passage regions 31 and reach the inner passage regions 33, leading to potential errors in registering the sequences.

Figure 6:
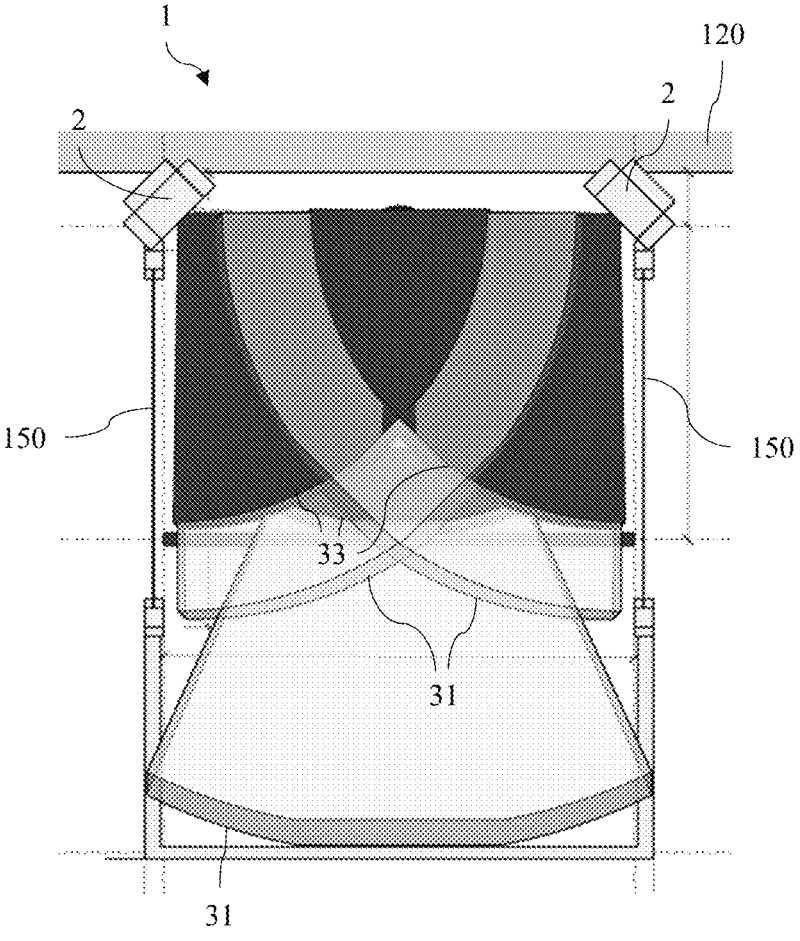

Finally, in the embodiment of FIG. 6 two side radar devices 2 and one central radar device 2 are provided, each having two passage regions 31, 33. Again, the passage regions 31, 33 are organized by the control unit 4 as an outer group of three outer passage regions 31 and an inner group of three inner passage regions 33. Blind spots are prevented, and it is adapted also to narrow passages, similar to the embodiment of FIG. 4. However, the sensing areas can be considered as two, that are fewer than the prior art.

It is worthwhile noting that each radar device 2 is preferably configured to generate occupation signals for both moving targets and static targets being present in passage regions 31, 32, 33. In radar devices for other applications instead only moving targets are detected, and not static targets. This is because the radar signal transmitted by the radar devices, reflected by the targets, and received again by the radar devices, is processed by removing a background component representing static objects. Instead, the radar devices 2 of the present invention are configured not to perform any background removal processing.

Accordingly, second events will not be registered just because a target has stopped moving, becoming invisible to the radar device 2, thus leading to a clearing signal. This is why, as commented above, the passage regions 31, 32, 33 of a radar device 2 should preferably not touch the outer protections 150 and any other radar device 2. In fact, these static objects could still be detected and determine permanent occupancy signals.

The above embodiments are given to show examples of the invention, but a skilled person may nevertheless realize other embodiments that fall within the scope of the following claims.

The invention claimed is:

1. A radar system for controlling accesses to an environment, comprising:
  one or more radar devices to be placed along an access path for accessing the environment, each radar device having a respective field of view,
    wherein the one or more radar devices are configured to define, in their respective fields of view, a plurality of passage regions arranged to be sequentially met while following said access path toward the environment,
    wherein the one or more radar devices include a first radar device configured to define at least two of said plurality of passage regions partially overlapping with each other or being disjoined to each other,
    wherein each radar device is configured to check the presence of targets in each passage region of its respective field of view, and generate an occupancy signal for every passage region where a target is present, and a clearing signal for every passage region where no target is present, and
  a control unit in signal communication with each radar device, the control unit storing therein a predetermined ordered entry sequence of events linked to respective passage regions and a predetermined ordered exit sequence of events linked to respective passage regions, the control unit being configured to switch a classification of the environment between clear and occupied by a target, by:
    registering a time sequence of occurring events linked to respective passage regions based on the occupancy signal and the clearing signal generated by each radar device for respective passage regions, wherein the events of the entry sequence, the events of the exit sequence and the events of the registered time sequence are first events and second events, wherein each one of the first events is linked to a specific passage region and given by a change from the clearing signal to the occupancy signal for the specific passage region, and each one of the second events is linked to a specific passage region and given by a change from the occupancy signal to the clearing signal for the specific passage region,
    when the environment is classified as clear, comparing an order of events and the passage regions linked to the events of the registered time sequence to an order of events and the passage regions linked to the events of the predetermined entry sequence and automatically changing the classification of the environment from clear to occupied by a target upon the order of events and the passage regions linked to the events of the registered time sequence matching the order of events and the passage regions linked to the events of the entry sequence, and
    when the environment is classified as occupied by a target, comparing the order of events and the passage regions linked to the events of the registered time sequence to an order of events and the passage regions linked to the events of the predetermined exit sequence, automatically changing the classification of the environment from occupied by a target to clear upon the order of events and the passage regions linked to the events of the registered time sequence matching the order of events and the passage regions linked to the events of the exit sequence, and not changing the classification of the environment from occupied by a target to clear upon the order of events and the passage regions linked to the events of the registered time sequence including one or more second events not matching the order of events and the passage regions linked to the events of the exit sequence.

2. The radar system of claim 1, wherein:
  the entry sequence includes, in the following order:
    a first event for an outer passage region, and
    a first event for an inner passage region, that is arranged to be met after the outer passage region while following the access path toward the environment,
  the exit sequence includes, in the following order:
    a second event for the inner passage region, and a second event for the outer passage region.

3. The radar system of claim 2, wherein:

the entry sequence includes, between said first events for the outer and inner passage regions, also a first event for at least one intermediate passage region, arranged to be met between the outer passage region and the inner passage region while following the access path toward the environment, and the exit sequence includes, between said second events for the inner and outer passage regions, also a second event for the at least one intermediate passage region.

4. The radar system of claim 1, wherein:

the control unit is configured, upon the environment being classified as occupied by a target and the registered time sequence not matching the exit sequence, to launch a stop mode, in which subsequent automatic changes of classification of the environment by the control unit, from occupied by a target to clear, are prevented, optionally, the control unit is configured to interrupt the stop mode and change the classification of the environment from occupied by a target to clear, upon receiving a release input by a user.

5. The radar system of claim 1, comprising a plurality of radar devices, wherein:

the control unit is configured to store at least one predetermined group of passage regions, each group comprising a plurality of passage regions, each from a different radar device, for each group of passage regions, the control unit is configured to combine individual occupancy signals and individual clearing signals for all the passage regions of the group into group occupancy signals and group clearing signals, for each group of passage regions, the control unit is configured to register first events and second events based on group occupancy signals and group clearing signals, and not based on individual occupancy signals and individual clearing signals for individual passage regions of the group.

6. The radar system of claim 5, wherein, for any group of passage regions:

a group occupancy signal is generated all the times that an individual occupancy signal is generated for any one of the passage regions belonging to the group, and a group clearing signal is generated all the times that individual clearing signals are generated for all the passage regions belonging to the group.

7. The radar system of claim 1, wherein each passage region is shaped as a circular sector with a respective radius and a respective angular width, wherein, for at least one radar device, plural passage regions are defined with different radii and overlapping angular width.

8. The radar system of claim 1, comprising two side protections, spaced from each other in a transversal direction, said access path to the environment being defined between the side protections and extending along a longitudinal direction, said environment being at one longitudinal end of the access path, wherein for at least one radar device, different passage regions reach different longitudinal portions of the access path.

9. The radar system of claim 8, wherein:

each radar device is configured to generate occupancy signals for both moving targets and static targets being present in passage regions, no passage region touches the side protections.

10. The radar system of claim 8, comprising a machinery, preferably a palletizer machine, arranged in said environment at one longitudinal end of the access path, the machinery being in signal communication with the control unit, wherein the machinery is configured to interrupt operation when the control unit changes the classification of the environment from clear to occupied by a target, and to restart operation when the control unit changes the classification of the environment from occupied by a target to clear.

11. A radar system for controlling accesses to an environment, comprising:

a radar device to be placed along an access path for accessing the environment, the radar device having a field of view including a plurality of passage regions arranged to be sequentially met while following said access path toward the environment; and a control unit in signal communication with the radar device, wherein:

the radar device is configured to detect a target in the field of view to check a presence or absence of the target in each passage region, the radar device is configured to generate an occupancy signal for every passage region where the target is present, and a clearing signal for every passage region where the target is absence, the control unit stores therein a predetermined ordered entry sequence of events linked to respective passage regions, and a predetermined ordered exit sequence of events linked to respective passage regions, the control unit is configured to register a time sequence of occurring events linked to respective passage regions based on the occupancy signal and the clearing signal generated by the radar device for respective passage regions, each one of the events of the entry sequence, the events of the exit sequence and the events of the registered time sequence is either one of a first event linked to respective passage regions or a second event linked to respective passage regions, the first event being given by a change from the clearing signal to the occupancy signal for respective passage regions, the second event being given by a change from the occupancy signal to the clearing signal for respective passage regions, the control unit is configured to switch a classification of the environment between clear and occupied by the target, when the environment is classified as clear, the control unit is configured to compare an order of events and the passage regions linked to the events of the registered time sequence to an order of events and the passage regions linked to the events of the predetermined entry sequence, and automatically change the classification of the environment from clear to occupied by the target upon the order of events and the passage regions linked to the events of the registered time sequence matching the order of events and the passage regions linked to the events of the entry sequence, and when the environment is classified as occupied by the target, the control unit is configured to compare the order of events and the passage regions linked to the events of the registered time sequence to an order of events and the passage regions linked to the events of the predetermined exit sequence, automatically change the classification of the environment from occupied by the target to clear upon the order of events and the passage regions linked to the events of the registered time sequence matching the order of events and the passage regions linked to the events of the exit sequence, and not change the classification of the environment from occupied by the target to clear upon the order of events and the passage regions linked to the events of the registered time sequence including the second event not matching the order of events and the passage regions linked to the events of the exit sequence.

12. The radar system of claim 11, wherein:
the plurality of passage regions include an outer passage region arranged in the access path and an inner passage region arranged in the access path and closer to the environment than the outer passage region is,
the entry sequence includes, in the following order:
    the first event for the outer passage region, and
    the first event for the inner passage region, and
the exit sequence includes, in the following order:
    the second event for the inner passage region, and
    the second event for the outer passage region.

13. The radar system of claim 11, wherein:
the plurality of passage regions include an outer passage region arranged in the access path, an inner passage region arranged in the access path and closer to the environment than the outer passage region is, and an intermediate passage region arranged in the access path and between the outer passage region and the inner passage region,

the entry sequence includes, in the following order:
    the first event for the outer passage region,
    the first event for the intermediate passage region, and
    the first event for the inner passage region, and
the exit sequence includes, in the following order:
    the second event for the inner passage region,
    the second event for the intermediate passage region, and
    the second event for the outer passage region.

14. The radar system of claim 11, wherein:
the control unit is configured, upon the environment being classified as occupied by the target and the order of events and the passage regions linked to the events of the registered time sequence not matching the order of events and the passage regions linked to the events of the exit sequence, to launch a stop mode, in which subsequent automatic changes of classification of the environment by the control unit from occupied by the target to clear are prevented.

15. The radar system of claim 14, wherein:
the control unit is configured to interrupt the stop mode and change the classification of the environment from occupied by the target to clear, upon receiving a release input by a user.

* * * * *